United States Patent [19]

Habermehl et al.

[11] Patent Number: 4,728,506

[45] Date of Patent: Mar. 1, 1988

[54] START-UP METHOD FOR AMMONIA PLANTS

[75] Inventors: Robert Habermehl, Shelbyville, Ky.; Donald Gill, Geismar, La.

[73] Assignee: Catalyst Services, Inc., Shelbyville, Ky.

[21] Appl. No.: 863,796

[22] Filed: May 16, 1986

[51] Int. Cl.$^4$ ............................................. C01C 1/04
[52] U.S. Cl. ........................... 423/359; 423/659; 423/652
[58] Field of Search ............... 423/651, 652, 653, 359, 423/659

[56] References Cited

U.S. PATENT DOCUMENTS

| | | | |
|---|---|---|---|
| 3,810,975 | 5/1974 | Brooke | 423/653 |
| 4,072,625 | 2/1978 | Pinto | 252/373 |
| 4,129,523 | 12/1978 | Snowden | 423/656 |
| 4,171,343 | 10/1979 | Faust et al. | 423/359 |
| 4,238,468 | 12/1980 | Bonnaci et al. | 423/362 |
| 4,296,085 | 10/1981 | Banquy | 252/376 |
| 4,414,195 | 11/1983 | Mandrin | 423/648 |

Primary Examiner—Helen M. S. Sneed
Assistant Examiner—Anthony McFarlane
Attorney, Agent, or Firm—Millen & White

[57] ABSTRACT

Low energy start-up procedure for ammonia plants which employs ammonia as the start-up media, thereby avoiding the BTU loss associated with venting unconverted hydrocarbons and the threat to catalyst beds associated with rapid buildup of temperatures therein.

7 Claims, 4 Drawing Figures

START-UP METHOD FOR AMMONIA PLANTS

BACKGROUND OF THE INVENTION

This invention relates to a start-up method for ammonia plants which produce a hydrogen-containing synthesis gas from hydrocarbon feed stock.

Almost all hydrogen and hydrogen-containing synthesis gases are produced by passing a heated gaseous stream of hydrocarbons and steam over nickel-containing catalysts. A major use of hydrogen is thus produced for the production of ammonia which occurs in the same plant which produced the synthesis gas. In the United States and other areas of the world with an abundant supply of natural gas, the preferred hydrocarbon feed is natural gas. In areas where natural gas is not readily available, the preferred feed stock is light naptha.

Plants that produce hydrogen and hydrogen-containing synthesis gases by the steam-reforming of hydrocarbons are subject to frequent start-ups and shutdowns. For example, a recent survey of ammonia plant shutdowns reported that the worldwide average for ammonia plants is 9 shutdowns per year. Williams, G. P. and Hoehing, W. W., "Causes of Ammonia Plant Shutdowns" Survey IV. AIChE Ammonia Safety Symposium, (November, 1982). Of these, 5 are due to major equipment failures, which probably necessitated a complete shutdown and re-start from ambient temperature conditions.

Such start-ups involve gradually raising the temperature of the catalyst beds in the various stages (primary and secondary reformers and carbon monoxide conversion stages) to their operating temperatures while passing a stream of hydrocarbon feed stock therethrough. Because unconverted or partially converted feedstock from one stage can damage the catalyst in the bed of a stage which follows, the unconverted or partially converted feed stock stream is vented and flared until all stages become operational, first usually after the high temperature shift stage, then after the $CO_2$ scrubbing stage and finally after the methanation stage.

Prior to the mid-70's, this wasting of natural gas as part of a start-up procedure was not a serious economic factor in the plant operation. However, in the early 1980's, rapid and dramatic increases in the cost of energy, especially natural gas and naptha, caused the cost of start-up of such plants to become excessively high. For example, Hays Mayo, in his paper presented at the August, 1985 AIChE Ammonia Symposium, entitled "Low Energy Accelerated Start-up of Ammonia Units", reported that the average cost of a start-up of a typical 1,000 t.p.d. natural gas-based ammonia plant was 30-35 billion BTU's and required 30 hours time. Therefore, the natural gas cost of each start-up was $75,000, assuming a price of $2.50 per million BTU, or an average annual expenditure of $375,000 per plant for natural gas alone. For naptha units, the cost would be approximately double the above figures due to the higher cost of naptha.

For these reasons, in 1983 Mayo developed a "Low Energy Accelerated Start-Up Process For Ammonia Plants" featuring more rapid heating rates for the primary reformer and synthesis sections of the plant. Mayo estimates his process reduces the energy costs for the average 1,000 t.p.d. ammonia plant based on natural gas from 30 to 35 down to 10-12 billion BTU and reduces the start-up time by 18 hours.

For naptha based plants, the savings using the Mayo procedure are estimated at 15 billion BTU's or $90,000 per start-up.

Others have considered reducing the cost of ammonia plant start-ups. Madhaven, S. and Kearney, D. J., in a report entitled "Reduced Energy Ammonia Plant Restart", presented at the Kellogg Ammonia Club Meeting of November, 1984, covered pertinent aspects of this subject and confirmed many of the recommendations of Mayo. As a result of these savings, the Mayo process has been quickly and widely adopted by the ammonia industry. Features of the Mayo process include raising the heating rates in the plant to 300° F. per hour and to reduce the process gas usage from about 50% of design to about 25% of design during the heat-up process.

It can be seen however, that flared feedstock hydrocarbons still represents a major start-up expense for such plants ($150,000/yr./plant).

This invention, in one of its embodiments, will result in an estimated additional savings beyond those achieved by the Mayo procedures of 6-9 billion BTU's per start-up of a natural gas—based 1,000 t.p.d. $NH_3$ plant and ordinarily even more than that for naptha-based plants. In addition, this invention will provide other advantages to producers of hydrogen and hydrogen-containing synthesis gases.

For example, in the Mayo procedure, natural gas is introduced to the primary reformer of an ammonia plant at 1400° F. The possibility exists that if the natural gas is added too rapidly or at somewhat lower temperatures, coking or carbon formation may form on the catalyst. This is especially true if some tubes are cooler than the bulk temperature of 1400° F., due to non-uniformity of firing the reformer. This carbon formation could result in hot tubes in the furnace curtailing production rates and, under the worst conditions, could cause a shutdown and replacement of the catalyst. Thus, the potential $50–60,000 savings in energy cost could become a potential $300,000 cost for catalyst replacement plus the loss of 3–5 days of production, if the plant experiences coking and requires a catalyst replacement. This invention eliminates this possibility.

Another advantage of this invention is the elimination of a possibility of feeding carbon oxides, which are poisons for the ammonia synthesis catalyst, into the synthesis section of the plant as a result of maloperation of the methanator.

Another advantage of this invention is the elimination of the possibility of nickel carbonyl formation and the release of nickel carbonyl to the atmosphere during the early stages of heat-up of the methanation catalyst. The carbonyl formation requires carbon oxides in the gas and the start-up media of this invention contains no carbon oxides.

Another advantage of this invention is the elimination of the time delay in lining out the $CO_2$ removal system before introduction of the gas to the methanator. This procedure is necessary in previously used start-up procedures because, if there is a high $CO_2$ content in the feed to the methanator, excessive heat of reaction is possible from the methanation of carbon oxides which could lead to damage of the methanation catalyst and, in the worst case, damage to the methanator vessel.

Still another advantage of this invention is that no time delay is required between the start of the heat-up process in the "front-end" or synthesis gas preparation section of the plant and the start of the heat-up process in the synthesis section of the plant. In the Mayo process, this delay amounts to approximately 3 hours or 3 billion BTU's.

Yet another advantage of this invention is that there is little or no loss of the start-up media other than leaks in the system. In the Mayo process, the synthesis gas produced by the reforming process is flared or vented for 6–8 hours providing a loss of 6–8 billion BTU's in energy costs. This invention requires no flaring or venting and the start-up media (except for leaks) is completely recoverable.

Yet another advantage of this invention is the elimination of the need to operate the air compressor at the inlet of the secondary reformer during the start-up process, thus saving additional energy.

OBJECTS OF THE INVENTION

It is an object of this invention to provide a novel start-up method for ammonia plants which produce hydrogen-containing synthesis gas from hydrocarbon feed stock. Another object of the invention is to provide a start-up procedure that will save a significant amount of energy as opposed to previously used start-up procedures. A further object to provide such a method which eliminates feed stock loss presently associated therewith. Another object is to provide such a method which eliminates the risk of carbon formation in the primary reformer. Still another object is to provide such a method which eliminates the possibility of nickel carbonyl formation. A further object is to eliminate the necessity of lining out the $CO_2$ removal system and the delay between the start of the front-end of the plant and the synthesis section. Other objects will be apparent to those skilled in the art to which this invention pertains.

SUMMARY OF THE INVENTION

This invention is a start-up procedure for a plant which produces a hydrogen-containing synthesis gas by the reaction of steam with hydrocarbon feed stocks over catalysts and converts the thus produced hydrogen containing synthesis gas at least partially into recoverable ammonia, wherein a gaseous stream of ammonia is employed as the start-up media during the start-up procedure.

BRIEF DESCRIPTION OF THE DRAWINGS

Various other objects, features and attendant advantages of the present invention will be more fully appreciated as the same becomes better understood when considered in connection with the accompanying drawings, in which like reference numerals designate the same stages of ammonia plant, and wherein:

FIG. 2 is a table listing the conditions which typically exist in a modern ammonia plant whose stages are depicted in FIG. 1a.

DETAILED DESCRIPTION

Figure 1A:
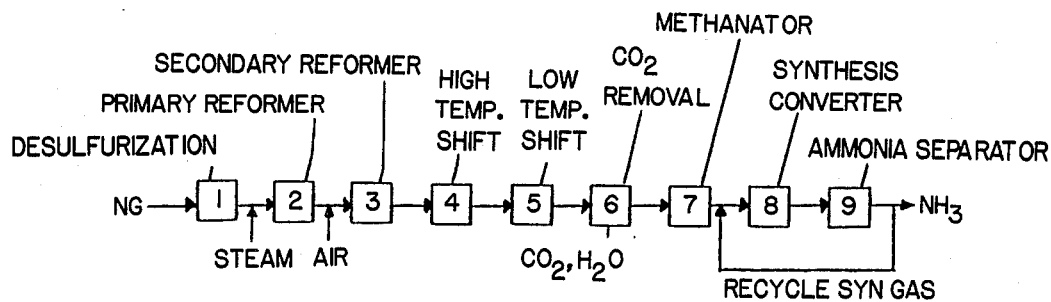
FIG. 1a is a flow charge depicting the various stages of a modern ammonia plant.

This invention employs the plant product, viz., ammonia vapor rather than hydrocarbon feedstock as the start-up media. When ammonia vapor is fed to the primary reformer of an ammonia plant, it is dissociated into an ammonia synthesis gas consisting of 75% $H_2$ and 25% $N_2$. When sufficient ammonia has been dissociated to reach a satisfactory pressure where the synthesis and recycle compressors can be operated satisfactorily, the dissociated ammonia synthesis gas is recycled from the synthesis loop back to the inlet of the primary reformer.

Because additional energy savings will be realized in a preferred embodiment, a second circulating loop is set up in the synthesis section of the plant going through the start-up heater and the synthesis catalyst reactor. In such a preferred embodiment, within 30 minutes or less from the time the undissociated ammonia is fed to the primary reformer, the start of the heat-up of the ammonia synthesis catalyst can occur.

In accordance with this invention, there is a short and one-time usage of energy for the dissociation of the ammonia. Thereafter, the only energy required is that expended to heat up the system to operating temperatures and to compensate for heat losses to the atmosphere. Conversely, in the Mayo process energy in addition to the above is required to reform the hydrocarbon for 6–8 hours.

It requires approximately 95,000 BTU's to reform one lb. mole of natural gas. Thus, in a Mayo start-up of a 1,000 t.p.d. plant 6–8 billion BTU's will be required to reform the hydrocarbon. Since it requires only about 24,000 BTU's to dissociate 1 lb. mole of $NH_3$, it is estimated that in a typical start-up of a 1,000 t.p.d. ammonia plant using the embodiments of this invention, there will be total energy requirement to dissociate the ammonia of only 0.05 billion BTU's, a savings of about 6–8 MMBTU from the Mayo process.

Additional savings are achievably due to the lower fuel requirements necessary just to heat up the system and cover heat losses rather than reform hydrocarbon.

This invention enables an ammonia plant to recover the ammonia dissociated in the start-up procedure (minus leaks) since, when the synthesis reaction occurs, it will be converted back to ammonia. Further, depending on the efficiency of heat recovery devices in the synthesis loop, a high percentage of the energy required for dissociation can also be recovered.

Petroleum refiners producing hydrogen for hydrogenation, hydrogen treating, hydrocracking, etc., usually produce some recoverable ammonia in these operations. In the block diagram of FIG. 1, a removing the secondary reformer and ammonia synthesis converter gives a typical $H_2$ plant. Recovering and storing the ammonia and using it to start up their plants rather than costly hydrocarbon feedstocks will result in considerable savings in accordance with this invention. In fact, there can be economic advantages to using ammonia as the start-up media even in plants which do not produce recoverable ammonia, i.e., to use purchased ammonia rather than plant ammonia.

A contemplated equivalent of the use of ammonia for start-ups according to this invention, is the use of methanol vapor as the start-up feed to the reformer in methanol plants. Methanol vapor will be readily dissociated in the reformer and thus saves the cost of the hydrocarbon feedstock during start-up. (In FIG. 1a of the drawings, if the secondary reformer, the 2 LTS catalysts, the $CO_2$ removal, methanation and synthesis stages are replaced by a methanol synthesis converter, one has a methanol plant.)

In accordance with this invention, ammonia plants are started up using ammonia rather than using hydrocarbon feed stock in the process. The vaporized ammonia is dissociated in the primary reformer until the entire plant is filled with ammonia synthesis gas at a relatively low pressure. Recirculation of the dissociated ammonia synthesis gas is then started with the synthesis gas compressor feeding the gas back to the primary reformer inlet.

A second re-circulation loop is set up through the start-up heater in the synthesis section of the plant, to heat-up the ammonia synthesis converter and thus permit a simultaneous heat up of the front and back ends of the plant.

Below is a comparison of the time required and the gas usage for the conventional start-up, a start-up using the Mayo process, and a start-up using the process of this invention.

|  | Conventional Process | Mayo Process | This Invention |
|---|---|---|---|
| | Times Required | | |
| 1st Step Heat reformer to 600° F. | 8 hrs. | 2 hrs. | 2 hrs. |
| 2nd Step Steam and heat reformer to 1400° F. | 10.5 hrs. | 2 hrs. | 2 hrs. |
| 3rd Step Gas in & line out front-end | 4 hrs. | 4 hrs. | 0.33 hr. (Add NH3) |
| 4th Step Heat & pressurize loop | 10 hrs. | 4 hrs. | 2 ⅔ hrs. |
| TOTAL: | 13.5 hrs. | 12 hrs. | 7 hrs. |
| | MMSCF Natural Gas Requirements | | |
| Step 1 | 2.8 | 0.7 | 0.7 |
| Step 2 | 7.4 | 1.1 | 1.1 |
| Step 3 | 5.4 | 4.2 | 0.2 |
| Step 4 | 14.5 | 5.4 | 1.5 |
| | 30.1 | 11.4 | 3.5 |

It can be seen comparisons that the process of this invention gives 5 more hrs. production time than the Mayo process and about 25 hrs. more than the conventional process. It utilizes 8 million SCF less natural gas than the Mayo and about 27 million less than the conventional process.

The savings at $3/MSCF are $24,000/start-up compared to the Mayo process or $120,000/year for the typical NH3 plant (assuming an average of 5 cold start-ups per year). Profit from the additional ammonia production at $10/ton would be $2,250/start-up or an additional $11,250/year.

The novel start-up process of this invention identical to the Mayo process for the first 2 steps (1st 4 hrs.) At Step 3, the novel process dissociates, for example, 2,000 moles/hr. of NH3 in ⅓rd of an hour. Step 4 of this process employs two circulating loops, viz., a primary reformer synthesis loop and a start-up heater-synthesis converter loop, and simultaneous heat-up of front and back ends of the plant.

The advantages of the novel start-up process are production time savings; natural gas savings; no cost for recirculating media (since it is converted back to NH3 product); no possibility of carbon formation in the primary reformer as a result of feeding NG too fast; no necessity to line out the CO2 removal system; no possibility of carbonyl formation in the heat-up of the methanator; and no possibility of poisoning the ammonia synthesis catalyst due to mal-operation of methanator.

Plant Description

Figure 2:
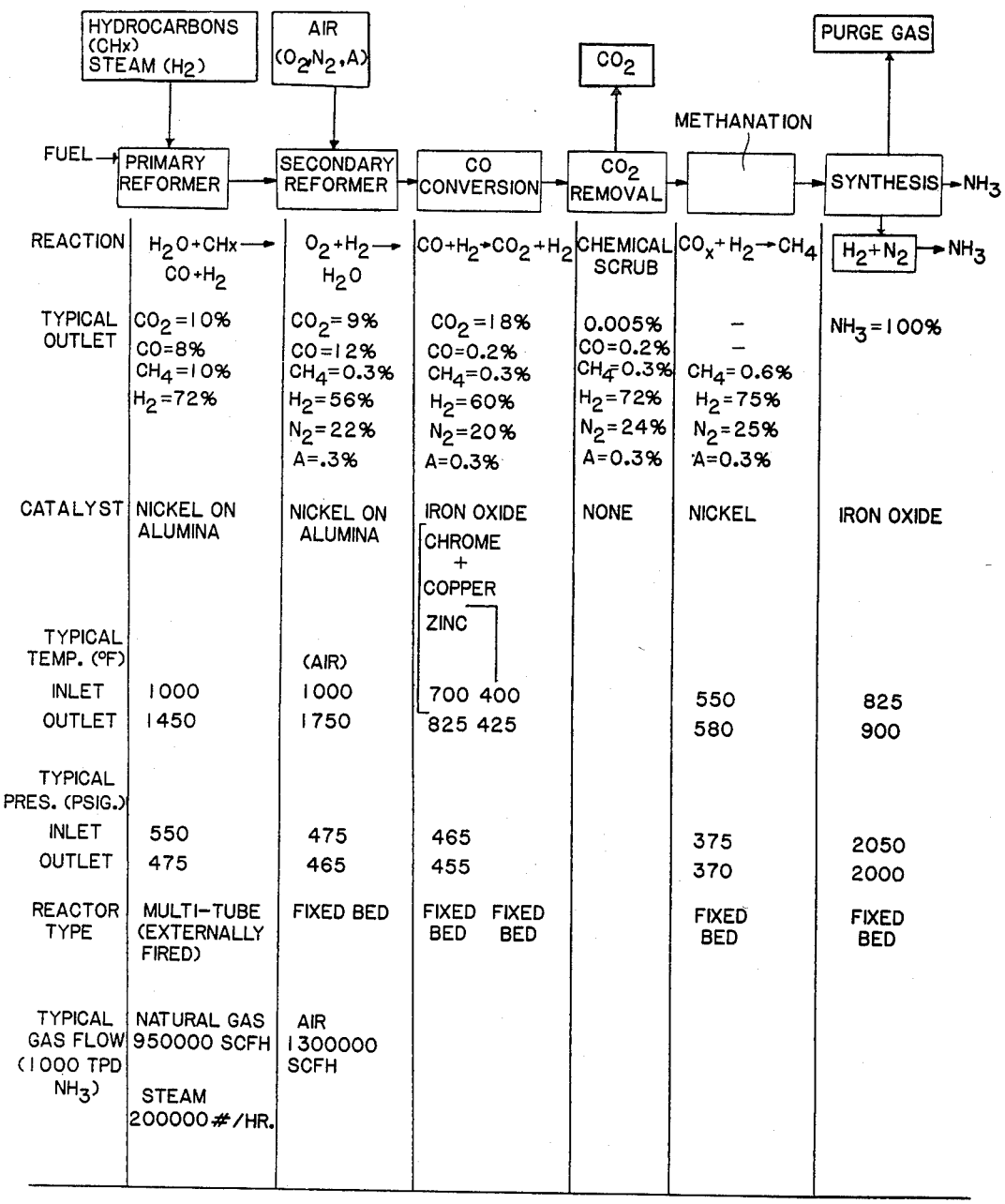

The following is a detailed description of the plant of FIGS. 1a and 2.

Desulfurized hydrocarbon feed stocks (methane to light naptha) are mixed with steam, pre-heated and fed to a multi-tube externally fired primary reformer containing a nickel on alumina catalyst.

The alloy tubes containing the catalyst are typically 3-4" diameter and about 40' long suspended vertically in a refractory lined box-like structure. A typical configuration in a 1,000 STPD ammonia plant is 378 tubes arranged in 9 rows with 10 rows of burners (200 burners) firing down between the tubes. Total catalyst volume in the primary reformer is about 550 c.f. The catalyst is typically in the form of ⅝" diameter Raschig rings ¼" to ⅜" in length with ¼" hole (although special shape and multi-hole rings are also used).

The nickel catalyst causes the following reactions to occur in the primary reformer.

Steam-hydrocarbon reforming—$CH_x + H_2O \rightarrow CO + H_2$ 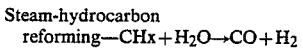

Water Gas Shift—$CO + H_2O \rightarrow CO_2 + H_2$ 

The effluent from the primary reformer at about 1450° F. is mixed with pre-heated air in a burner type device at the inlet of the secondary reformer.

Oxygen in the air reacts with hydrogen in the primary reformer effluent and the highly exothermic reaction provides additional heat to cause further reforming to occur over the nickel on alumina catalyst in the secondary reformer.

The secondary reformer is a refractory lined vertical vessel and for a typical 1,000 TPD plant will contain about 900 c.f. of catalyst, again in the form of Raschig rings of ⅝" to 1" diameter.

The effluent of the secondary reformer at about 1,750° F. is fed to a waste heat boiler where it is cooled to 700°-750° for entry into the first of 2 or more CO conversion reactors.

The first CO converter (High Temperature Shift) contains a chromium promoted iron oxide catalyst in the form of pellets (typical=⅜" d.×¼" length).

Additional CO conversion (Water Gas Shift Reaction) occurs over the HTS catalyst. This is an exothermic reaction and results in a 100°-150° temperature rise as the gases pass through the adiabatic reactor containing one or more fixed beds of catalyst.

The effluent from the HTS catalyst at 825°-850° is cooled by indirect means in a heat exchanger or by direct quench with condensate to about 400°. It is then fed to one or more Low Temperature Shift (LTS) converters containing fixed beds of Copper-Zinc Oxide catalyst where additional CO conversion occurs due to the more favorable equilibrium of the Water Gas Shift Reaction at lower temperatures. The copper-zinc oxide catalyst is in the form of tablets (typical=¼" d.×⅛"

The effluent of the final LTS reactor is cooled to the point where the majority of the H2O in the effluent is condensed out and the gaseous mixture is then fed to a scrubber where CO2 is chemically reacted out of the gas.

The effluent of the CO2 scrubber is then reheated to 550°-600° F. and fed to the methanator containing a supported nickel catalyst in the form of tablets (a typical ¼"-⅜" d). The purpose of this step is to complete the removal of carbon oxides by the methanation reaction. Methanation ($CO_x + H_2 \rightarrow CH_4 + H_2O$) is required because oxygen containing compounds act as poisons for the downstream ammonia synthesis catalyst.

The methanator outlet is cooled and fed to the synthesis gas compressor, where the pressure is elevated from about 375 psig to 2100 psig. In the final stages of compression the fresh make-up gas is mixed with the recycle gas in the ammonia synthesis loop and the mixture is fed to the ammonia synthesis converter.

The ammonia synthesis converter usually contains 2 or more beds of a promoted iron oxide catalyst, with some form of cooling (direct or indirect) between beds to take advantage of the more favorable equilibrium at lower temperatures. The synthesis reaction is $3H_2 + N_2 \rightarrow 2NH_3$. The promoted iron-oxide catalyst is in the form of granules with a typical size of 6–10 mesh.

Figure 1B:
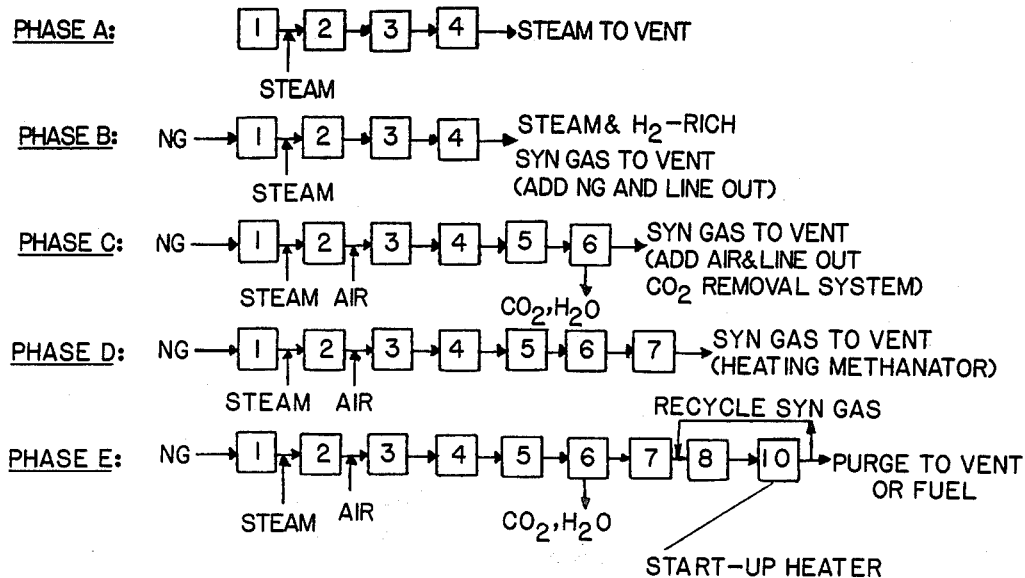
FIG. 1b is a flow chart depicting the prior art Mayo low energy start-up procedure described herein.
Figure 1C:
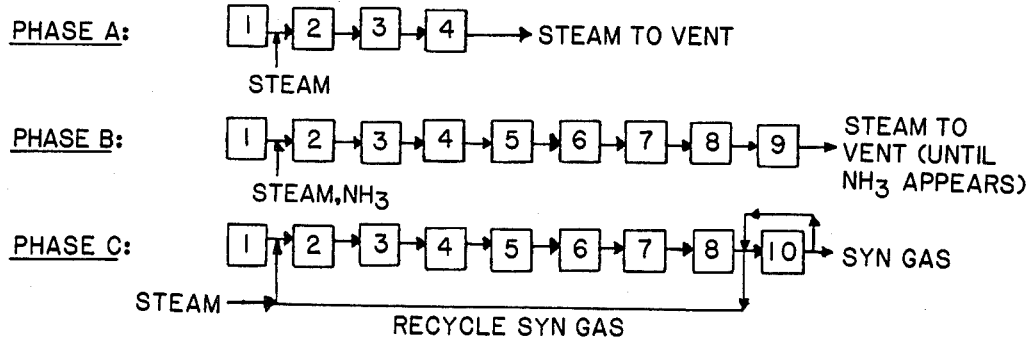
FIG. 1c is a flow chart depicting the novel startup procedure of this invention.

Typical conditions (temperature, pressure, flow, etc.) for the catalytic units are shown in FIG. 1.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Fahrenheit and all parts and percentages are by weight, unless otherwise indicated.

EXAMPLE

The following is a start-up procedure for a plant shown schematically in FIG. 2.

HOUR 1

Plan to heat up the primary reformer at a rate of 300°–350° F./hr. The ID fan is started during pre-startup time. Light 3 burners on the inside rows and 2 on the outside rows. Burner pressure should be the lowest that gives a stable flame, e.g., about 3 psig. Hold header at 3 psig. As heat is needed, add more burners. Light 2 burners on the 1500 lb. boiler. Put MIC's on board as soon as possible. Prepare to start air compressor oil pumps and lube oil heating. With vent at HTS open, start slow roll of standby HP boiler feed pump, reaching 300°–350° F. reformer radiant outlet at end of first hour.

HOUR 2

Continue heating the primary at 300°–350° F./Hr. Light burners in the primary 1500 lb. boiler as required. Charge ammonia to the refrigeration system and get refrigeration machine ready for slow roll. Let down 1500 lb. steam to the 550 lb. header as required. Start heating LTS as soon as the radiant section flue gas outlet temperature is at 300° F. Recover heatup gas by sending it to the fuel system. Start warming steam line to process flow controller. Start warming up 50 lb. steam line to steam reboiler. Radiant section flue gas outlet should be at 650°–700° F. by end of second hour.

HOUR 3

At 600° F. radiant section flue gas outlet, admit steam to primary inlet at 25% rate. Vent after HTS wide open to hold minimum pressure. Put steam in air coil. Put cooling stem on packing of HTS inlet temperature control valve. Check drains primary and secondary WNB's. When dry, close drains. Keep outlet of mixed gas feed near 975° F. The reformer tube outlet should be at 1000°–1050° at end of Hour 3.

HOUR 4

When the primary outlet reaches 1000° F., put 105-J, 103-J, and 101-J on slow roll in that order. When the primary outlet reaches 1400° F., process as follows:

1. Bring 105-J up to 5800 RPM, close kickbacks and admit a small amount of ammonia vapor to the process steam line upstream of the mixed gas preheater to primary inlet; Open kickbacks and admit ammonia to the NH3 flash drums as required to hold levels;
2. Close the vent at high temperature shift and start filling plant with NH3 synthesis gas from NH3 decomposition in the primary reformer to suction of 103-J with LTS blocked out and heating; Drain condensate from shellside of 103-C and tubeside of 104-C until dry;
3. Increase firing on the primary and flow of NH3 vapor to the primary;
4. Continue heating LTS with exit heating gas to the fuel system; and
5. Continue increasing NH3 vapor flow to the primary, holding 1400° F. exit temperature and filling and heating secondary, HTS and methanator until suction pressure of 150 psig is reached at end of hour 4.

HOUR 5

When 150 psig is reached in the absorber, begin recirculation in MEA system at 50% design. When heat is received at the gas reboiler, add steam if available to the steam reboiler. Bring 103-J from slow roll through critical speed to 8000 RPM and pressure up the synthesis loop. Start NH3 injection to suction. Pressuring of synthesis loop should take 30–40 minutes. Close recycle inlet block, leave converter inlet block open to prevent overpressure, and synthesis loop feed valve open. When converter pressure is the same as 103-J discharge, open SP-1 recycle inlet valve. Close converter inlet valve HCV-11 and all quench valves. Throttle SP=70 as required to get startup heater flow to 41,200#/Hr. (1,800,000 SCFH). Close MIC-13, 14, 15 & 16. Light startup heater. Fire heater to maximum burner pressure. Do not exceed rated process gas outlet temperature of 1000° F. at 1500 psig or less. Adjust process flow on startup heater to get 1000° F. outlet. Time from full firing to 1000° F. outlet should be about 15 minutes. With 100° F. inlet, 1000° F. outlet duty of 24.5 MMBtu/Hr. process flow=32,950#/Hr. or 1,445,000 SCFH. This condition should be reached by the end of hour 5.

HOUR 6

Establish flow of synthesis from syn loop back to primary inlet up to 200,000 SCFH along with NH3 vapor to continue heating entire front end of plant until primary inlet reaches 250 psig. With HCV-11 and quench valves closed, expect gas temperature to top bed of converter to be 750°–800. Heating rate on top bed should be 20° F./° F. minute from 100° F. to 600° F. with the startup heater at full firing and 1000° F. outlet. Bring one bed to light off in about 40 minutes. Anticipating light off, proceed as follows:

1. Bring the natural gas booster 102-J to 80% of normal speed (thru surge) on kickback;
2. Bring the air compressor 101-J to 80% of normal speed (thru surge) to vent;
3. When LTS is above 350° F. and methanator is at 450°–500° F.;

(a) Reduce LTS heating gas to 225,000 SCFH (25% of design);
(b) Block LTS in and send heating gas to the primary reformer as process gas;
(c) Discontinue NH₃ vapor flow to the process steam line and condense NH₃ in the NH₃ condenser;
(d) Light secondary reformer at 25% of design air flow; and
(e) Purge LTS to fuel with syn gas and place LTS in operation.

HOUR 7

When the first bed lights off, start raising process rates and firing rates gradually. When all beds are active, shut down startup heater. Increase process gas, steam and air, MEA circulation, etc., and make all other process adjustment to reach desired production rate.

The piping required to accomplish the foregoing is:

1. An 8" or 10" line from the discharge of 105-J discharge to the process steam line entering mixed preheater in convection section double blocked and bleed with chain wheels positive shutoff valves required. No ammonia must mix with natural gas or natural gas with ammonia.

2. A line from the LTS heatup gas line to the fuel system feeding auxiliary boilers as well as to the primary reformer fuel system.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a start-up procedure for a plant comprising in sequence at least one reformer stage, a CO conversion stage, a $CO_2$ removal stage and a methanization stage; wherein said plant synthesizes a hydrogen-containing synthesis gas from a stream of hydrocarbon feedstock and reforms the thus produced hydrogen containing synthesis gas at least partially into recoverable ammonia, the improvement wherein a gaseous stream of ammonia is employed as the start-up media during the start-up procedure by introducing the ammonia into the reformer stage to form an ammonia containing start-up synthesis gas, passing the ammonia containing start-up synthesis gas through a start-up heater, thereby heating the ammonia containing start-up synthesis gas with said start-up heater and cycling the thus heated ammonia containing start-up synthesis gas through the sequential stages of the plant until the plant is brought to operating temperature.

2. The process according to claim 1, wherein the ammonia is produced from the synthesis gas by an iron oxide catalyzed reaction of hydrogen and nitrogen contained in the synthesis gas.

3. The start-up procedure according to claim 1, wherein the reformer stage employs a nickel-catalyst for producing the hydrogen-containing synthesis gas.

4. The start-up procedure according to claim 1, wherein the hydrogen-containing gas is purified to remove $CO_2$.

5. An improvement in start-up procedures for a plant used to produce ammonia wherein the plant includes sequentially: a primary reformer, a secondary reformer, at least one stage of a CO converter, a $CO_2$ removal system, a methanator, an ammonia synthesis converter, a fuel-fired start-up heater and a gas compressor; the gas compressor having a line connecting the output thereof to the input of the primary reformer to form a first circulating loop and connecting the output of said primary reformer to the input of the ammonia synthesis converter to provide a second circulating loop, the plant producing ammonia by routing preheated desulfurized hydrocarbon gas, steam and air in succession through the plant; the improvement in start-up procedures comprising:
   a. heating the primary reformer with steam to a temperature sufficient to dissociate vaporized ammonia into ammonia synthesis gas;
   b. providing an ammonia start-up synthesis gas by feeding vaporized ammonia and steam into the heated primary reformer to produce ammonia synthesis gas, and
   c. using the ammonia synthesis gas thus produced to heat the plant to operating temperature by circulating the thus heated ammonia synthesis gas through the first circulating loop and the second circulating loop.

6. The improvement of claim 5, wherein the primary reformer is configured as a fuel-fired tubular reformer employing a nickel catalyst, which nickel catalyst is used to achieve dissociation of the NH₃ into synthesis gas.

7. The improvement of claim 5, wherein oxygen is added to the secondary reformer by introducing air therein.

* * * * *